United States Patent [19]

Momany et al.

[11] Patent Number: 5,262,612
[45] Date of Patent: Nov. 16, 1993

[54] COMPUTER-CONTROLLED LASER CUTTER

[75] Inventors: Patrick J. Momany; James Tinney, both of Seattle, Wash.

[73] Assignee: Edgewise Tools, Inc., Norco, Calif.

[21] Appl. No.: 875,799

[22] Filed: Apr. 29, 1992

[51] Int. Cl.$^5$ ............................................. B23K 26/14
[52] U.S. Cl. ......................... 219/121.67; 219/121.82; 364/474.08
[58] Field of Search .................. 219/121.67, 121.72, 219/121.73, 121.82, 121.67, 121.78; 364/474.08

[56] References Cited

U.S. PATENT DOCUMENTS

| | | | |
|---|---|---|---|
| 4,700,044 | 10/1987 | Hokanson et al. | 219/121.63 |
| 4,985,780 | 1/1991 | Garnier et al. | 219/121.68 X |
| 5,051,558 | 9/1991 | Sukhman | 219/121.68 |
| 5,089,683 | 2/1992 | Stephenson et al. | 219/121.78 |

*Primary Examiner*—C. L. Albritton
*Attorney, Agent, or Firm*—Christensen, O'Connor, Johnson & Kindness

[57] ABSTRACT

A laser beam generator is mounted stationarily relative to a sheet roll feed mechanism of the type used in roll feed drafting plotters so as to project a laser beam lengthwise of the crossrail of such feed mechanism. A right angle reflecting and focusing assembly is mounted on a carriage moveable along the crossrail for directing the laser beam toward a sheet positioned by the feeder. The sheet is moved in one axis (the x-axis) by the roll feed mechanism, while the reflecting and focusing assembly is moved in the other axis (y-axis) by the carriage—all under computer control. On-off signals for the laser are derived from the pen up, pen down signaling mechanism of the plotter so that a design or pattern is cut in the sheet as though the plotter were drawing a drafting pattern. Mechanism is provided to calculate the actual speed of the focused laser beam relative to the sheet being cut and to adjust the power output of the laser automatically so that a uniform cut is achieved. Inert gas under pressure is supplied to the area of the cut in synchronism with actuation of the laser.

22 Claims, 8 Drawing Sheets

COMPUTER-CONTROLLED LASER CUTTER

FIELD OF THE INVENTION

The present invention relates to automated cutters using lasers as the cutting implements, particularly sheet cutters.

BACKGROUND OF THE INVENTION

One known type of computer-controlled laser cutter has a large horizontal vacuum table for maintaining the sheet to be cut taut and in position. Long parallel rails extend along opposite sides of the table. A single crossrail extends perpendicularly between the side rails and is moveable along them. The laser is mounted on a carriage moveable along the crossrail. The beam of the laser is directed down and is focused at approximately the upper surface of the table. A computer controls actuation of the laser and also controls motors for moving the crossrail along the side rails (x-axis control) and for moving the laser carriage along the crossrail (y-axis control) to cut a desired pattern or design in the sheet supported stationarily on the table.

In another known type of computer-controlled laser cutter, the laser is supported stationarily above a horizontal table assembly and has its beam focused at or close to the tabletop. Rather than moving the laser over the table, however, the tabletop is moved in a horizontal plane while the laser is actuated to cut or engrave a desired pattern or design in the workpiece supported on the tabletop.

Laser cutters of the type described above are expensive because of the precise motion control required in order to cut or engrave a detailed design or pattern. Accomplishing precise motion control is complicated by the heavy and bulky components moved, i.e., the laser or the tabletop supporting the workpiece.

SUMMARY OF THE INVENTION

The present invention provides a computer-controlled laser cutter in which the heavy and sometimes delicate parts of the laser beam generator can be mounted stationarily while a reflecting and focusing mechanism is moved over a sheet to be cut. The sheet can be moved in one axis (the x-axis) by roll feed mechanism of the type used in roll feed drafting plotters, while the reflecting and focusing mechanism is moved in the other axis (y-axis) by a carriage such as the pen carriage of such a plotter. On-off signals for the laser can be derived from the pen up, pen down signalling mechanism of the plotter. Preferably, mechanism is provided to calculate the actual speed of the focused laser beam relative to the sheet being cut and to adjust the power output of the laser automatically so that a uniform cut is achieved. For cutting fabric or other flimsy materials, the material can be adhered to a backing sheet which is resistive to being cut by the focused laser.

DETAILED DESCRIPTION OF THE PREFERRED EMBODIMENTS

Figure 1:
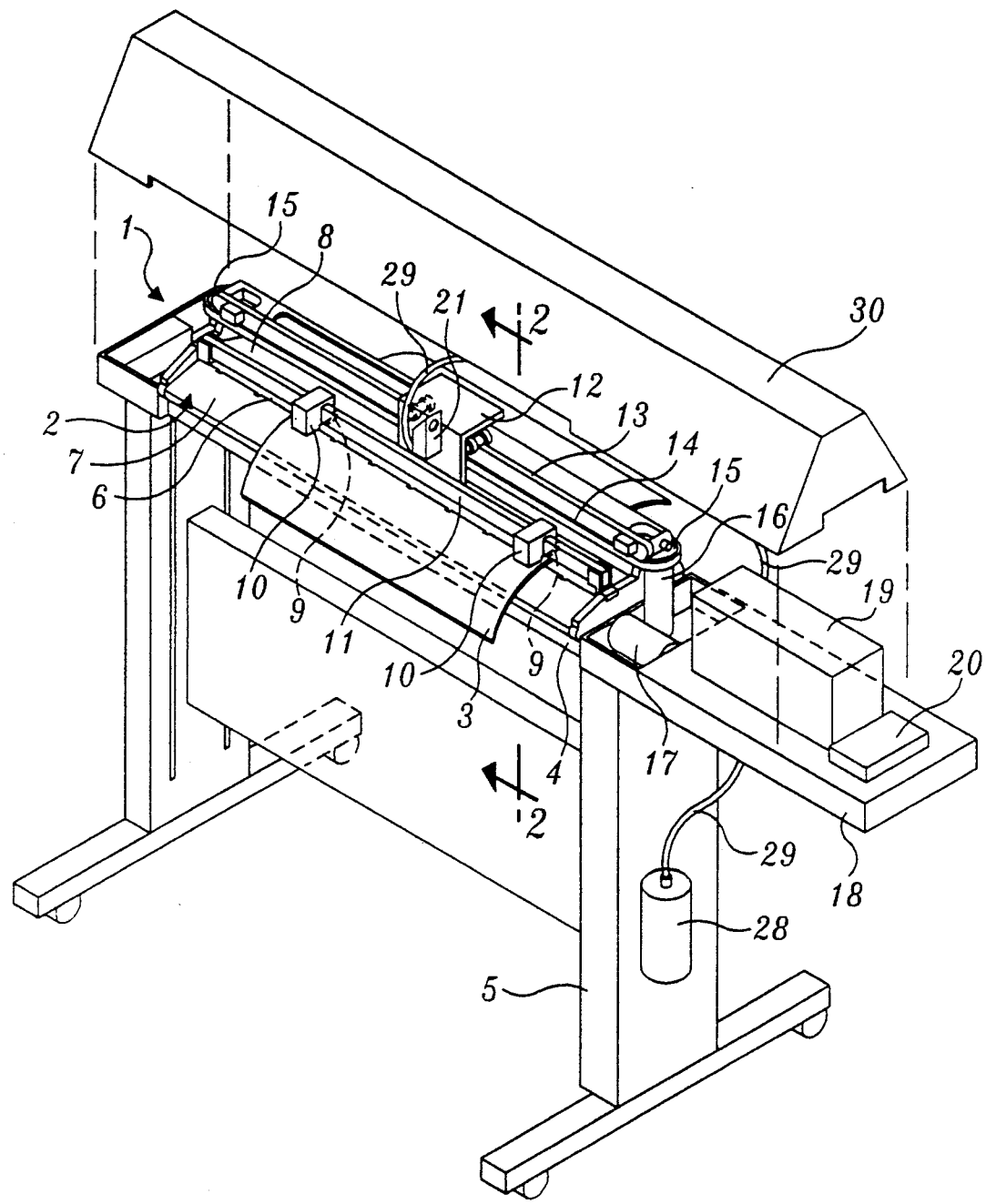
FIG. 1 is a somewhat diagrammatic top perspective of a computer-controlled laser cutter in accordance with the present invention.

As shown in FIG. 1, a computer-controlled laser cutter 1 in accordance with the present invention preferably uses a roll feeder 2 of the type commonly used in drafting plotters for moving a sheet 3 in one dimension, commonly referred to as the x-axis. The feeder can be mounted on a platform 4 supported on a stand 5.

Roll feeder 2 includes a central feed roll 6 protruding upward slightly between a front guide plate 7 and a rear guide plate 8. Sheet 3 is held snugly against the live feed roll 6 by spring-biased idler rollers 9 mounted on shuttle blocks 10 adjustable along a bar 11 extending lengthwise of and close alongside the feed roll 6.

A pen carriage 12 is moveable lengthwise of the feed roll along a horizontal crossrail 13 which is mounted over the rear guide plate 8. In a representative drafting plotter, the carriage is moved by an endless band 14 extending around pulleys 15 at opposite ends of the feeder. One of the pulleys is rotated by a motor 16 under computer control to adjust the transverse (y-axis) position of the pen carriage over sheet 3. Similarly, feed roller 6 is driven by a motor 17 under computer control to adjust the longitudinal (x-axis) position of the sheet.

As thus far described, the apparatus is conventional and corresponds to the sheet feeder (x-axis assembly) and the pen carriage and its drive mechanism (y-axis assembly) used in the Model 936 drafting plotter available from Zeta Graphics Corporation of Martinez, Calif.

In accordance with the present invention, the platform 4 supporting sheet feeder 2 is provided with an extension 18 for a conventional laser 19. In a representative embodiment, laser 19 can be a ten watt Series 48 "D" Version laser available from Synrad, Inc. of Bothell, Wash. Platform 18 also supports the laser power controller 20 which can be the Model CA-48 controller also available from Synrad, Inc. Laser 19 is mounted so as to project its beam lengthwise of the sheet feeder 2 toward a reflecting and focusing assembly 21 mounted on the pen carriage 12 in lieu of the reciprocating pen or pens which otherwise would be mounted on the carriage. In a representative embodiment, such reflecting and focusing assembly can be the right angle focusing assembly sold under the trademark "RAL 2.5" by Synrad, Inc. Normally such assembly is stationarily mounted on the laser beam generator, but in the present invention such assembly is mounted on carriage 12.

Figure 2:
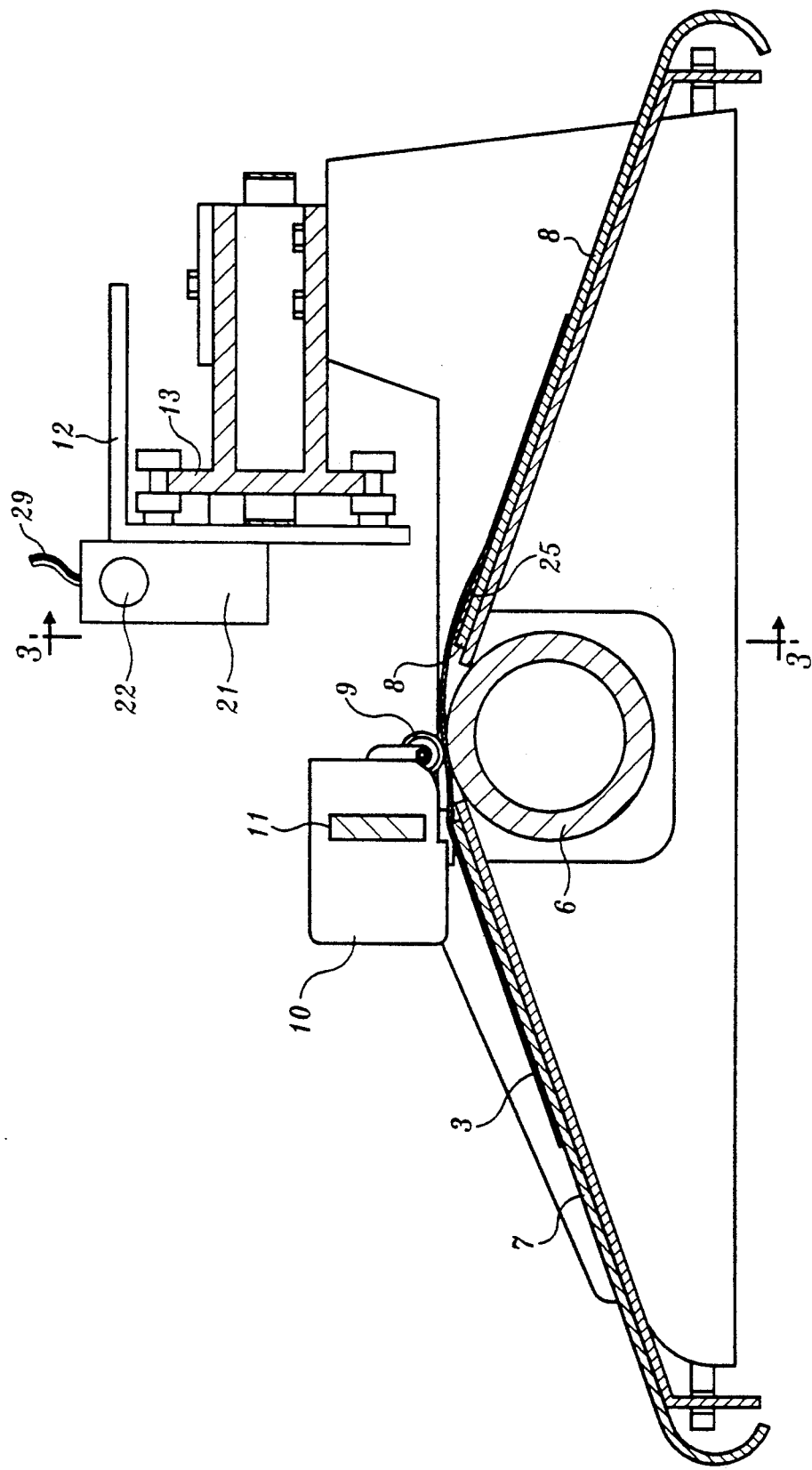
FIG. 2 is an enlarged, diagrammatic, vertical section of such cutter taken along line 2—2 of FIG. 1 with some parts deleted.
Figure 3:
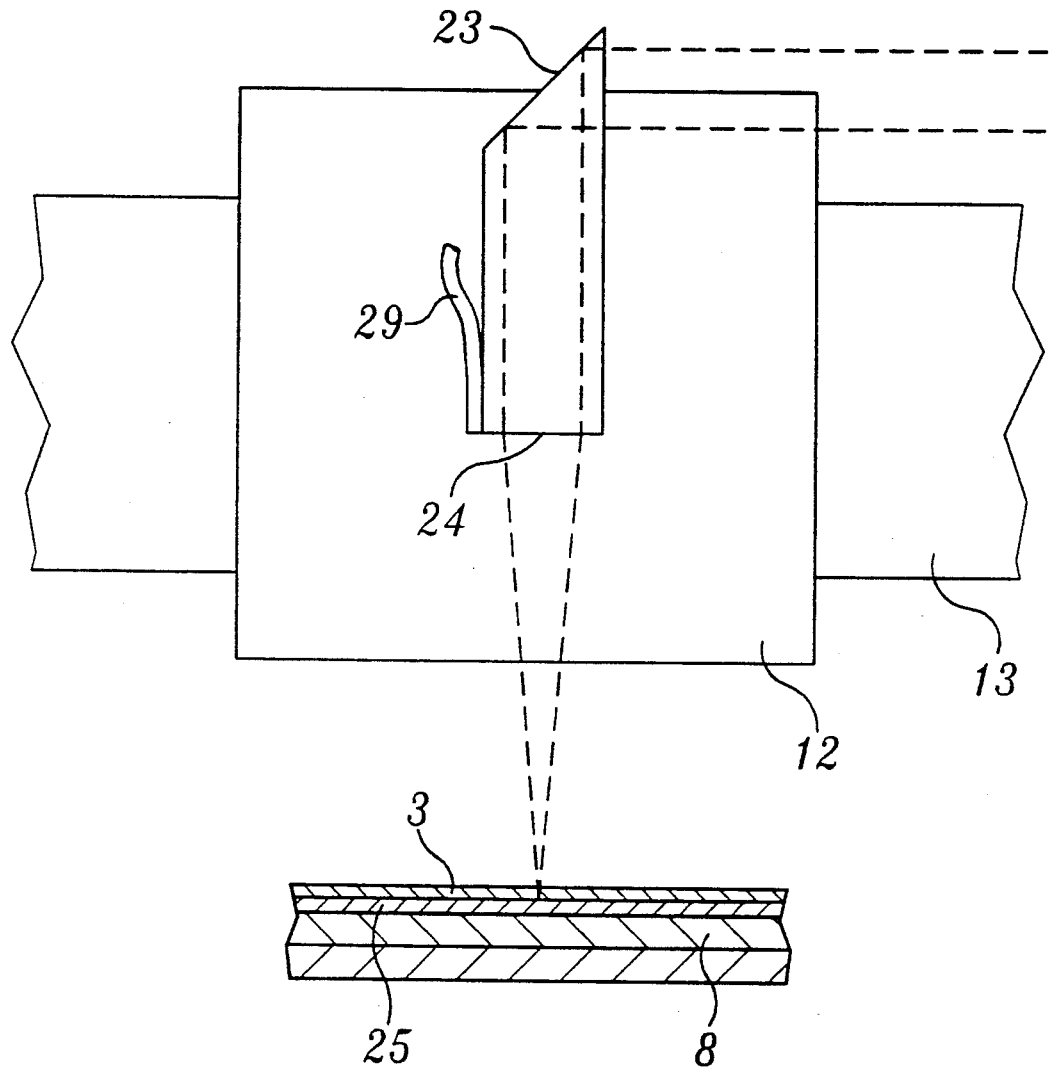
FIG. 3 is an enlarged, diagrammatic, fragmentary, side elevation of components of such cutter viewed from line 3—3 of FIG. 2.

With reference to FIG. 2 and FIG. 3, the reflecting and focusing assembly 21 has a front aperture or opening 22 exposing a mirror 23 and forming a target for the laser beam. For the Series 48 "D" Version Synrad laser, the beam has a diameter of about 3 mm. as compared to the diameter of the opening for the RAL 2.5 right angle focusing assembly of about 0.4 inch so that the diameter of the beam is much smaller than the diameter of the opening allowing for less than perfect aiming, and vibration or other misalignment causes during use. Mirror 23 reflects the beam 90° downward to the bottom lens portion 24 of the assembly. Such lens portion focuses the beam to essentially a point (0.006 inch spot size) at a distance of about 2.5 inches below the bottom end of the assembly. Consequently, preferably the assembly is mounted so that its bottom end is approximately 2.5 inches above the surface of the rear guide plate 8. A protective strip 25 of laser resistant material such as aluminum can be applied over the rear guide plate to protect it against damage over a long period of use, although under normal operating conditions the laser will not be so strong as to damage the plate.

Figure 4:
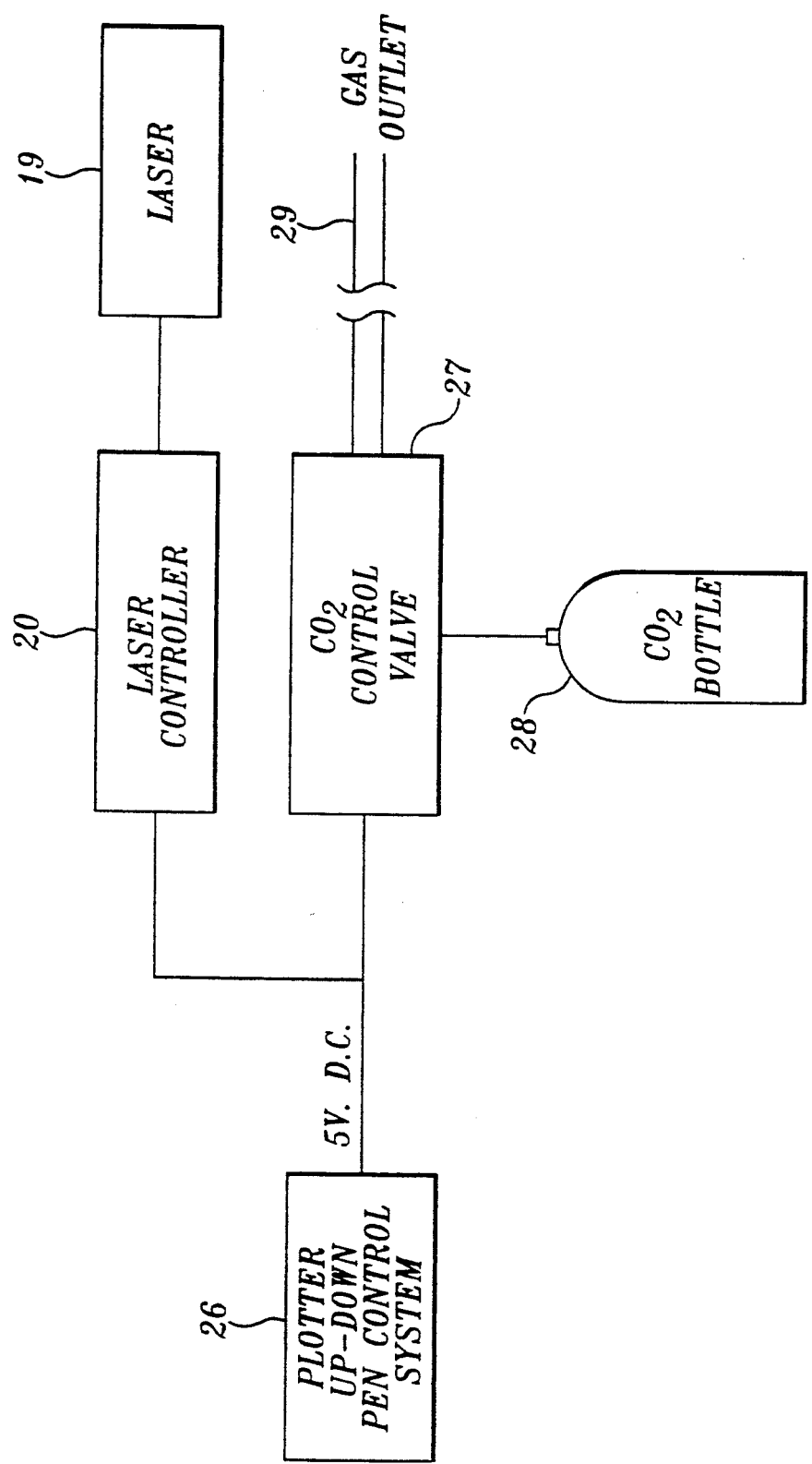
FIG. 4 is a block diagram of part of the control system of a computer-controlled laser cutter in accordance with the present invention, namely, the on-off control for actuating the laser and for controlling the supply of inert gas under pressure to the area of the cut.

With reference to FIG. 4, on-off control for the laser 19 can be triggered through the controller 20 by the plotter up-down pen control system 26. In a representative plotter, the pen control system provides a 0 to 5 volt DC logic signal to control the up-down position of the drafting pen, or the pen control signal can be easily converted to a 5 volt DC logic signal. Such signal is supplied to the "gate" input of the conventional laser controller (Synrad CA-48) for an on-off control of the laser. Consequently, the laser is actuated at the same time that the plotter pen would be triggered to move downward into engagement with a drawing sheet, so that the same computer control can be used for cutting a sheet moved by the plotter sheet feeder as would be used for drawing a design on a drafting sheet.

Preferably the same on-off signal is supplied to a control valve 27 for a supply 28 of inert gas under pressure, such as carbon dioxide. An exhaust tube 29 extends to the pen carriage 10 as illustrated in FIG. 1 and has an outlet end opening closely adjacent to the bottom of the reflecting and focusing assembly 21 and directed toward the focal point of the focused laser beam. The automatic supply of inert gas under pressure directly to the cut area cools the cut material, prevents charring and burning so as to provide a more reliable and cleaner cut and also significantly reduces smoke and small particulates which, depending on the material, could be hazardous. For additional protection, a top cover or shroud 30 can be provided along with an exhaust fan and filter arrangement to collect particulates generated during the cutting procedure. As also illustrated in FIG. 1, the reservoir or bottle 28 of inert gas under pressure can be mounted on the stand 5 and the outlet tube 29 can be routed through the shroud. Sufficient slack must be provided to allow for the y-axis movement of the pen carriage and for removal of the shroud for adjustment or maintenance of the equipment.

Figure 5A:
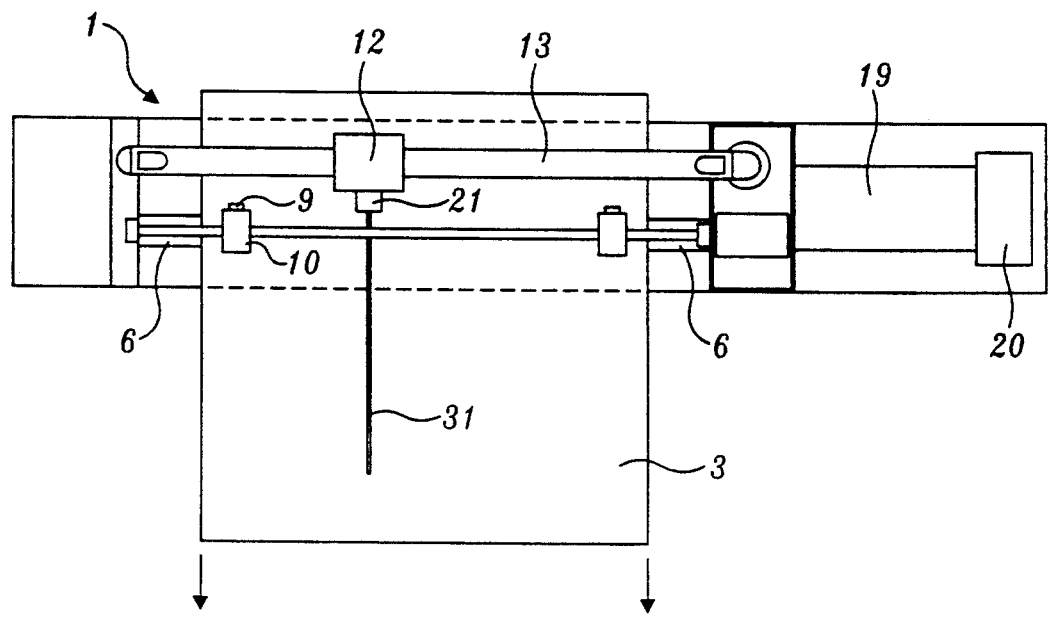
FIG. 5A is a very diagrammatic top plan of a computer-controlled laser cutter in accordance with the present invention illustrating a cut in an axial direction.
Figure 5B:
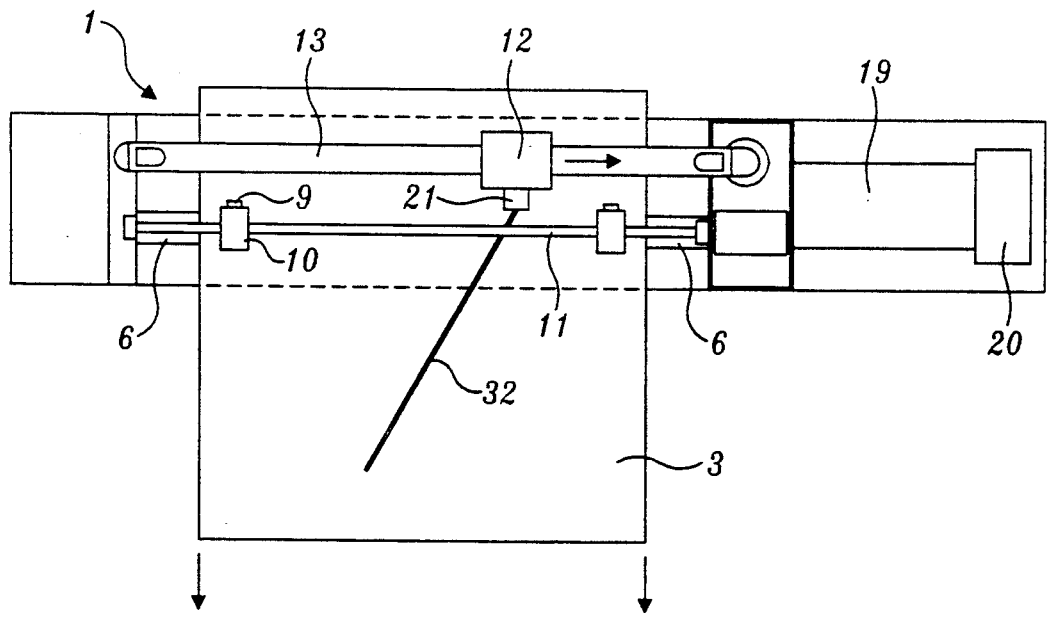
FIG. 5B is a corresponding very diagrammatic top plan illustrating a cut in a nonaxial direction, i.e., a diagonal cut.

With reference to FIG. 5A, conventional drafting plotters typically have a maximum x-axis speed equal to the maximum y-axis speed. For example, for a straight x-axis cut 31 achieved by maintaining the pen carriage stationary while moving the sheet 3 by operation of the sheet feeder, the maximum speed for the Model 936 Zeta drafting plotter is 30 inches per second. Similarly, the maximum speed of the pen carriage in the y-axis direction is 30 inches per second. For a diagonal cut, however, such as the 45° degree cut 32 illustrated in FIG. 5B achieved by feeding the sheet in the x-axis while moving the carriage in the y-axis, the actual speed of the focused laser beam relative to the sheet is greater, up to 42 inches per second for the Model 936 Zeta. In addition, more processing is required for standard plotters to track more complicated shapes, such as complex curves, in which case the actual speed of the carriage and, hence, the focused laser beam relative to the sheet can be much slower. In order to maintain a consistent cut, preferably the output power of the laser is adjusted as a function of the true speed of the focused laser beam relative to the material being cut.

Figure 6:
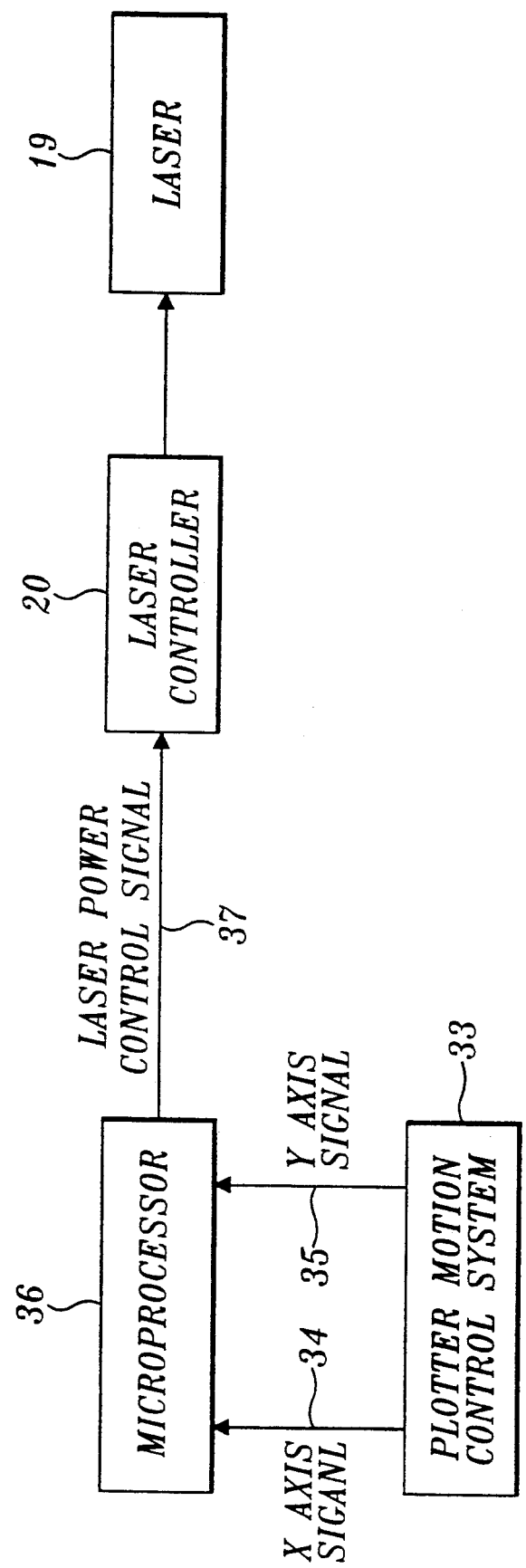
FIG. 6 is a block diagram of another part of the control system of a computer-controlled laser cutter in accordance with the present invention, namely, the preferred system for controlling the power of the laser.

With reference to FIG. 6, standard plotters have motion control systems 33 which include feedback signals 34 and 35 from the x-axis and y-axis motors, respectively, in which the motor speed is encoded. For example, for the motion control system used in the Model 936 Zeta, sensors associated with each motor provide high-low voltage pulse signals in which pulse width (duration) is proportional to motor speed. In accordance with the present invention, preferably the x-axis motor speed signal 34 and y-axis motor speed signal 35 are analyzed by a microprocessor 36 which is programmed to calculate the true speed of movement of the pen carriage relative to the sheet and to output a logic signal 37 to the laser controller 20. The CA-48 Synrad controller is adapted to receive a 5 volt logic signal in which short pulse width results in high power output and long pulse width results in lower power output, for example. In accordance with the present invention, preferably higher laser power is provided when the sheet is moving fast relative to the focused laser beam than when the sheet is moving slower relative to the laser beam. The power adjustment based on actual speed of the focused beam relative to the sheet results in a consistent cut.

Figure 7:
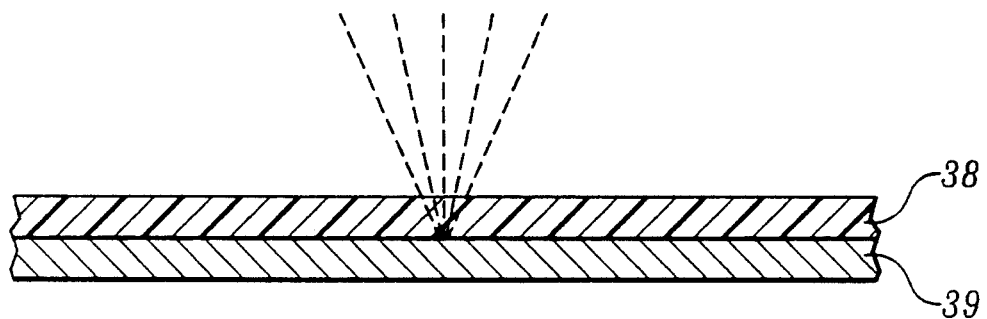
FIG. 7 is a vertical section of a representative sheet material of a type cuttable by a computer-controlled laser cutter in accordance with the present invention.
Figure 8:
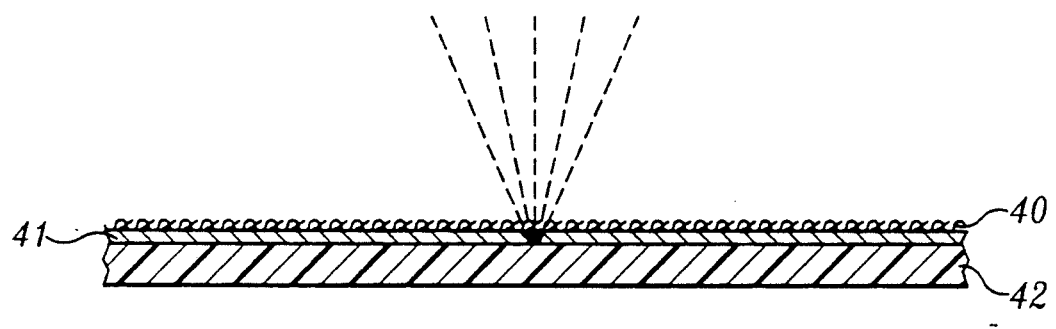
FIG. 8 is a vertical section of another type of sheet material cuttable by a computer-controlled laser cutter in accordance with the present invention with a specialized backing for such material adapted for use in the present invention.

For example, with reference to FIG. 7, one representative sheet material to be cut by the computer-controlled laser cutter in accordance with the present invention is thin sheet vinyl 38 releasably secured to a backing sheet 39. By proper adjustment, the laser can precisely cut the top vinyl layer 38 without penetrating through the backing 39 for convenient separation of a cut section of the vinyl sheet from the backing after the cutting procedure has been completed. With reference to FIG. 8, more flimsy materials such as a layer of fabric 40 can be releasably secured to a thin flexible sheet 41 more resistant to penetration by the laser. FIG. 8 illustrates the upper fabric sheet 40 releasably secured to a thin aluminum sheet 41 which itself is secured to a thicker acetate sheet 42 for stability. The present invention can be used to cut the fabric into pattern pieces consistently, quickly and cheaply. After the fabric is removed, the backing, including both the acetate and aluminum sheets, can be reused.

Figure 9:
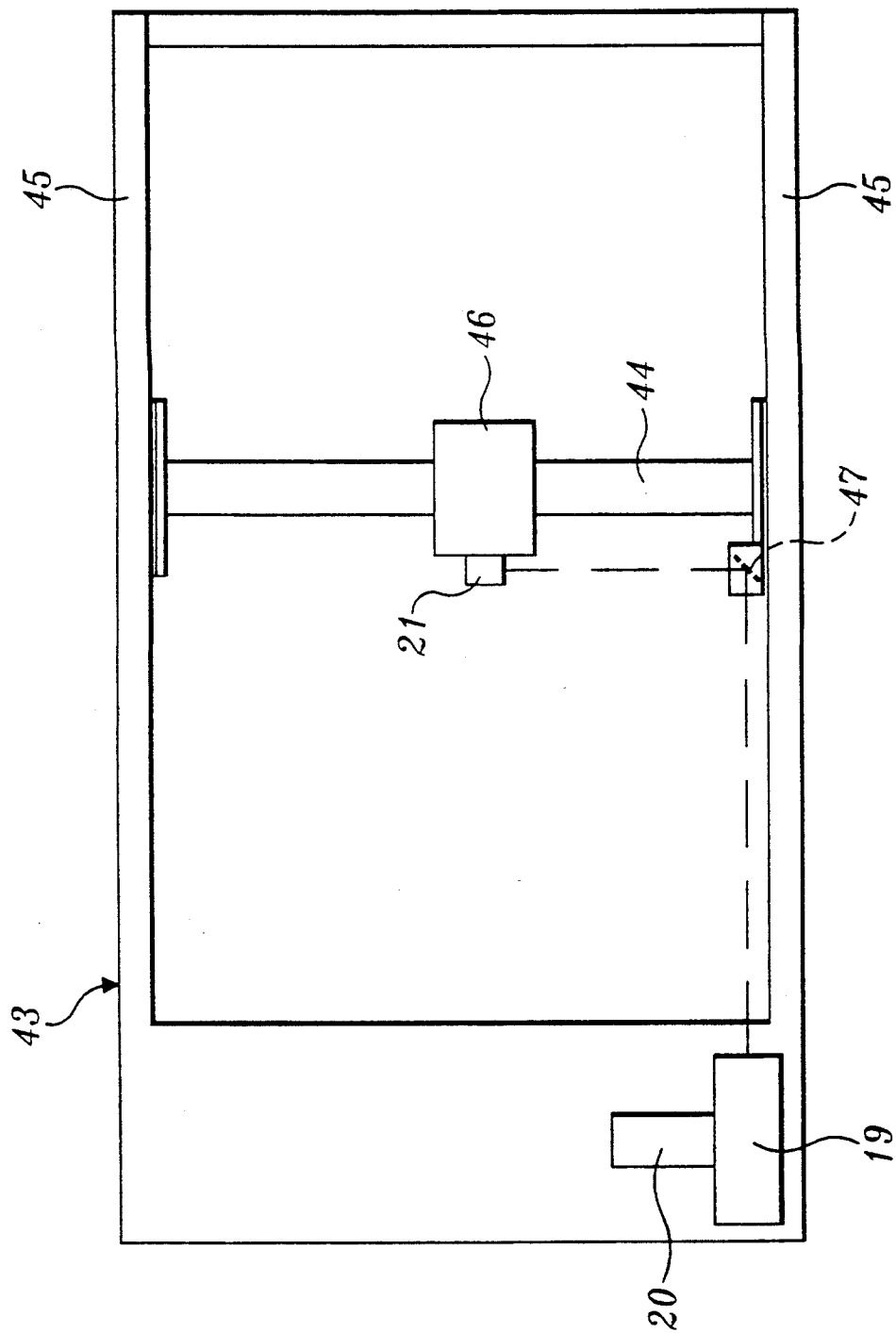
FIG. 9 is a diagrammatic top plan of a modified form of computer-controlled laser cutter in accordance with the present invention.

With reference to FIG. 9, the present invention also is adapted for use with flat bed plotters. Plotter 43 illustrated in FIG. 9 includes a crossrail 44 moveable lengthwise along side rails 45. A pen carriage 46 is moveable along the crossrail. Conventionally, up and down movement of the drafting pens and actuation of motors for moving the pen carriage and the crossrail is under computer control. In accordance with the present invention, the laser 19 and the associated controller 20 are mounted adjacent to one corner of the flat bed plotter 48 so as to direct its beam longitudinally along a side rail 45 to a mirror 47 mounted on an extension of the crossrail. Such mirror is positioned to reflect the laser beam inward to the right angle focusing assembly 21 which is mounted on the pen carriage 46. As for the previously described embodiment, on-off actuation of the laser can be triggered by the pen up, pen down signal of the plotter. Similarly, power control of the laser can be by use of the circuit represented in FIG. 6 in which x-axis and y-axis signals of the plotter control system are analyzed by a microprocessor which outputs a signal causing adjustment of the laser power output as a function of the actual speed of the pen carriage relative to the sheet or article on the bed of the plotter.

In either embodiment, the heavy and somewhat delicate laser generator is mounted stationarily, and only the light reflecting and focusing mechanism is moved relative to the sheet to be cut.

We claim:

1. A computer-controlled cutter for cutting a desired pattern in a workpiece comprising means for generating a laser beam, means for positioning the workpiece, means for mounting said generating means substantially stationarily relative to said workpiece-positioning means, means for directing the laser beam generated by said generating means onto the workpiece to cut it, means mounting said directing means in the path of the laser beam generated by said generating means but moveable lengthwise of said beam and relative to said positioning means for changing the location of the directed laser beam relative to the workpiece so as to change the area of the workpiece acted on by said directed laser beam, means for automatically controlling actuation of said generating means in combination with movement of said means mounting said beam-directing means to cut the desired pattern in the workpiece, means for detecting the speed of movement of the directed laser beam relative to the workpiece, and means for adjusting the power output of said laser beam generating means as a function of the detected speed.

2. The cutter defined in claim 1, in which the means for positioning the workpiece includes means for moving the workpiece in one dimension relative to the means for mounting the generating means, and in which the means for mounting the directing means includes means for moving the directing means in a second dimension relative to the means for mounting the generating means.

3. The cutter defined in claim 2, in which the workpiece is a sheet and the means for moving the workpiece in one dimension is a roll feeder.

4. The cutter defined in claim 1, in which the directing means includes a right angle focusing assembly.

5. The mechanism defined in claim 4, in which the means for mounting the directing means includes a crossrail and a carriage moveable along said crossrail toward and away from the laser beam generating means, the right angle focusing assembly being mounted on said carriage for movement along said crossrail.

6. The cutter defined in claim 5, in which the means for mounting the laser beam generating means mounts such generating means in position so as to project the laser beam lengthwise of the crossrail.

7. The cutter defined in claim 5, in which the workpiece positioning means includes a flat bed and means for maintaining the workpiece substantially stationary relative to said flat bed, said flat bed including opposite side rails and a crossrail moveable transversely of its length and lengthwise of said side rails, the means for mounting the laser beam generating means including means positioning such generating means so as to project the laser beam generally lengthwise of one of said side rails, and the directing means including a first reflector in the path of the laser beam generated by the generating means, moveable with the crossrail and reflecting the laser beam from a direction lengthwise of the adjacent side rail to a direction lengthwise of the crossrail and a second reflector moveable along said crossrail.

8. The cutter defined in claim 1, in which the adjusting means include means for automatically increasing the power output of the generating means so as to be greater for fast relative speed detected by the detecting means and so as to be lower for slower speed detected by the detecting means to achieve a substantially uniform cut in the workpiece.

9. The cutter defined in claim 1, in which the workpiece includes a flexible sheet, and including a backing of a material resistive to being cut by the laser beam and means for releasably securing the flexible sheet to the backing.

10. The cutter defined in claim 9, in which the backing includes a thin metal film and a thicker sheet of a different material adhered to said metal film.

11. The cutter defined in claim 1, including a source of gas under pressure, means for supplying gas from said source to the area of the workpiece acted on by the directed laser beam, and means for actuating said supplying means substantially in synchronism with actuation of the generating means by the controlling means.

12. A computer-controlled cutter for cutting a desired pattern in a workpiece comprising means for generating a laser beam, means for positioning the workpiece, means for directing the laser beam generated by said generating means onto the workpiece to cut it, means for moving said directing means relative to said positioning means to change the location of the directed laser beam relative to the workpiece so as to change the area of the workpiece acted on by the directed laser beam, means for automatically controlling actuation of said generating means in combination with movement of said directing means by said moving means to cut the desired pattern in the workpiece, means for detecting the speed of movement of the directed laser beam relative to the workpiece, and means for adjusting the power output of said laser beam generating means as a function of the detected speed.

13. The cutter defined in claim 12, in which the adjusting means includes means for automatically increasing the power output of the generating means so as to be greater for fast relative speed detected by the detecting means and so as to be lower for slower speed detected by the detecting means to achieve a substantially uniform cut in the workpiece.

14. The cutter defined in claim 12, in which the generating means is mounted substantially stationarily relative to the workpiece positioning means, the moving means including means mounting the directing means in the path of the laser beam generated by the generating means but movable lengthwise of such beam.

15. The cutter defined in claim 14, in which the workpiece is a sheet, the means for positioning the workpiece including a roll feeder for moving the workpiece in one dimension relative to the means for directing the laser beam.

16. The cutter defined in claim 12, including a source of gas under pressure, means for supplying gas from said source to the area of the workpiece acted on by the directed laser beam, and means for actuating said supplying means substantially in synchronism with actuation of the laser beam generating means.

17. A computer-controlled cutter for cutting a desired pattern in a workpiece comprising means for generating a laser beam, means for positioning the workpiece, means for mounting said generating means substantially stationarily relative to said workpiece positioning means, means for directing the laser beam generated by said generating means onto the workpiece to cut it, means for moving said directing means in the path of the laser beam generated by said generating means but movable lengthwise of said beam and relative to said positioning means for changing the location of the directed laser beam relative to the workpiece so as to change the area of the workpiece acted on by the directed laser beam, means for automatically controlling actuation of said generating means in combination with movement of said means mounting said beam directing means to cut the desired pattern in the workpiece, a source of gas under pressure, means for supplying gas from said source to the area of the workpiece acted on by the directed laser beam, and means for actuating said supplying means substantially in synchronism with actuation of the laser beam generating means.

18. The cutter defined in claim 17, in which the workpiece is a sheet, the means for positioning the workpiece including a roll feeder for moving the workpiece in one dimension relative to the means for mounting the generating means, and in which the means for mounting the directing means includes means for moving the directing means in a second dimension relative to the means for mounting the generating means.

19. A computer-controlled cutter for cutting a desired pattern in a workpiece comprising means for generating a laser beam, means for positioning the workpiece, means for directing the laser beam generated by said generating means onto the workpiece to cut it, means for moving said directing means relative to said positioning means to change the location of the directed laser beam relative to the workpiece so as to change the area of the workpiece acted on by the directed laser beam, means for automatically controlling actuation of said generating means in combination with movement of said directing means by said moving means to cut the desired pattern in the workpiece, a source of gas under pressure, means for supplying gas from said source to the area of the workpiece acted on by the directed laser beam, and means for actuating said supplying means substantially in synchronism with actuation of the generating means by the controlling means.

20. The cutter defined in claim 19 in which the workpiece is a sheet, the positioning means including a roll feeder for moving the workpiecd in one dimension relative to the directing means.

21. A computer-controlled cutter for cutting a desired pattern in a workpiece comprising means for generating a laser beam, means for positioning the workpiece, means for mounting said generating means substantially stationarily relative to said workpiece positioning means, means for directing the laser beam generated by said generating means onto the workpiece to cut it, means mounting said directing means in the path of the laser beam generated by said generating means but movable lengthwise of said beam and relative to said positioning means to change the location of the directed laser beam relative to the workpiece so as to change the area of the workpiece acted on by said directed laser beam, and means for automatically controlling actuation of said generating means in combination with movement of said means mounting said beam directing means to cut the desired pattern in the workpiece, the workpiece being a sheet, and said means for positioning the workpiece including a roll feeder for moving the workpiece in one dimension relative to said means for mounting the generating means, said means for mounting the directing means including means for moving said directing means in a second dimension relative to said means for mounting said generating means.

22. A computer-controlled cutter for cutting a desired pattern in a workpiece comprising means for generating a laser beam, means for positioning the workpiece, means for directing the laser beam generated by said generating means onto the workpiece to cut it, means for moving said directing means relative to said positioning means to change the location of the directed laser beam relative to the workpiece so as to change the area of the workpiece acted on by said directed laser beam, means for automatically controlling actuation of said generating means in combination with movement of said directing means by said moving means to cut the desired pattern in the workpiece, the workpiece being a sheet, and the means for positioning the workpiece including a roll feeder for moving the workpiece in one dimension relative to the directing means.

* * * * *

UNITED STATES PATENT AND TRADEMARK OFFICE
CERTIFICATE OF CORRECTION

PATENT NO. : 5,262,612
DATED : November 16, 1993
INVENTOR(S) : P. J. Momany et al.

It is certified that error appears in the above-indentified patent and that said Letters Patent is hereby corrected as shown below:

| COLUMN | LINE | |
|---|---|---|
| 1 | 60 | after "laser." insert --Also, inert gas under pressure can be supplied to the area of the focal point of the laser for a clean cut. Preferably, the inert gas is supplied to the cut area in synchronism with actuation of the laser beam generator. |
| 3 | 41 | after "for" delete "an" |
| 8 | 12 | "workpiecd" should read --workpiece-- |

Signed and Sealed this

Nineteenth Day of April, 1994

Attest:

BRUCE LEHMAN

Attesting Officer     Commissioner of Patents and Trademarks